United States Patent [19]
Kawamura

[11] Patent Number: 5,975,765
[45] Date of Patent: Nov. 2, 1999

[54] BEARING DEVICE FOR WHEELS

[75] Inventor: Motoshi Kawamura, Nara-ken, Japan

[73] Assignee: Koyo Seiko Co., Ltd., Japan

[21] Appl. No.: 09/061,821

[22] Filed: Apr. 16, 1998

[30] Foreign Application Priority Data

Apr. 23, 1997 [JP] Japan .................................. 9-120247

[51] Int. Cl.⁶ .................................................. F16C 19/08
[52] U.S. Cl. ........................................ 384/537; 384/544
[58] Field of Search .................................. 384/537, 544, 384/585, 513, 569

[56] References Cited

U.S. PATENT DOCUMENTS 5,490,732  2/1996  Hofmann et al. ..................... 384/537
5,813,769  9/1998  Chueh ..................................... 384/537

FOREIGN PATENT DOCUMENTS 57-151102  9/1982  Japan .

*Primary Examiner*—Lenard A. Footland
*Attorney, Agent, or Firm*—Adams & Wilks

[57] ABSTRACT

The present invention discloses a bearing device for a wheel for automotive vehicles in which the construction of a spline fitting portion is improved.

In a spline fitting portion between a shaft formed integral with an outer ring of a uniform universal joint and a roller bearing, a collar formed in an shaft end is caused to encroach upon a radial recess of the inner ring to secure the inner ring to the shaft.

1 Claim, 1 Drawing Sheet

BEARING DEVICE FOR WHEELS

FIELD OF THE INVENTION

The present invention relates to a bearing device for a wheel for automotive vehicles.

DESCRIPTION OF THE PRIOR ART

A conventional bearing device for a wheel is disclosed, for example, in Japanese Utility Model Application Laid-Open No. 57-151102 issued on Sep. 22, 1982. This bearing device for a wheel will be explained with reference to FIG. 2. An axially extending shaft 23 is integrally formed on the side of a closed surface of a bowl-like outer ring 22 of a uniform universal joint 20, and a spline 30 is formed in the outer peripheral surface of the shaft 23. The spline 30 is fitted in a spline 31 formed in an inner ring 24 of a roller bearing 21.

The construction of the roller bearing 21 will be described in more detail, which comprises the inner ring 24 formed with a flange 25 for mounting a wheel at an outer peripheral surface thereof and formed with the spline 31 at an inner peripheral surface thereof, an outer ring 26 formed with a flange 27 for mounting a vehicle body at an outer peripheral surface thereof, and rolling bodies 28, 29 interposed between the inner and outer rings 24, 26.

The rolling bodies 28, 29 are constituted in two rows. One row rolling body 28 is interposed between the outer ring 26 and the inner ring 24, and the other row rolling body 29 is interposed between the outer peripheral surface of the bowl-like outer ring 22 of the uniform universal joint 20 used in combination with the inner ring and the outer ring 26. In the state in which the inner ring 24 is fitted in the shaft 23, a locknut 33 is fastened to the end of the shaft 23 through a washer 32, and the roller bearing 21 is secured to the shaft 23.

In the bearing device for a wheel as described, it is necessary to secure a fitting portion between the splines 30, 31 necessary for transmission of torque. Therefore, an axial length of the fitting portion between the splines 30, 31 is increased or a diametral dimension is increased. This inhibits a compactness. Further, it is difficult to completely eliminate a play caused by a clearance in the fitting portion between the splines, and the management not to affect the running stability of the vehicle is cumbersome. Further, when the roller bearing 21 is secured to the shaft 23, the washer 32 and the locknut 33 are necessary, posing a problem in that the number of parts increases.

SUMMARY OF THE INVENTION

It is an object of the present invention is to provide a bearing device for a wheel which increases a torque transmission portion to enable compactness and which eliminates a play in a spline fitting portion.

A bearing device for a wheel according to the present invention comprises an outer ring of a uniform universal joint, a shaft integral with the outer ring and extending in an axial direction and formed with a spline at an outer periphery thereof, an outer ring of a roller bearing, an inner ring formed with a flange for mounting a wheel at an outer periphery thereof and formed with a spline fitted in the first-mentioned spline at an inner periphery thereof, a rolling body interposed between the inner and outer rings of the roller bearing, a recess formed in a central portion of an end of the shaft, a plurality of recesses formed in a circumference of an end of the inner ring on the end side of the shaft, a collar formed by rolling and caulking the recess of the end of the shaft, the collar being spread from the inner peripheral side to the outer peripheral side and formed in a radial direction, and fixing means for, in the state in which the shaft and the spline of the inner ring are fitted, causing the collar to encroach upon the radial recess of the inner ring to secure the inner ring to the shaft.

As described above, the present invention is constituted by the spline fitting portion between the outer peripheral surface of the shaft and the inner peripheral surface of the inner ring, and the encroaching portion between the radial collar of the end of the shaft and the radial recess of the end of the inner ring. Therefore, the region of the torque transmission portion is long, and the device can be made compact without increasing the axial length or the radial length of the spline fitting portion.

Further, the influence of the play in the spline fitting portion can be eliminated by the encroachment between the radial collar of the end of the shaft and the end of the inner ring. Furthermore, parts such as the washer for fixing the shaft and the locknut are not required to have the effect in that the number of parts is reduced.

DESCRIPTION OF THE PREFERRED EMBODIMENT

Figure 1:
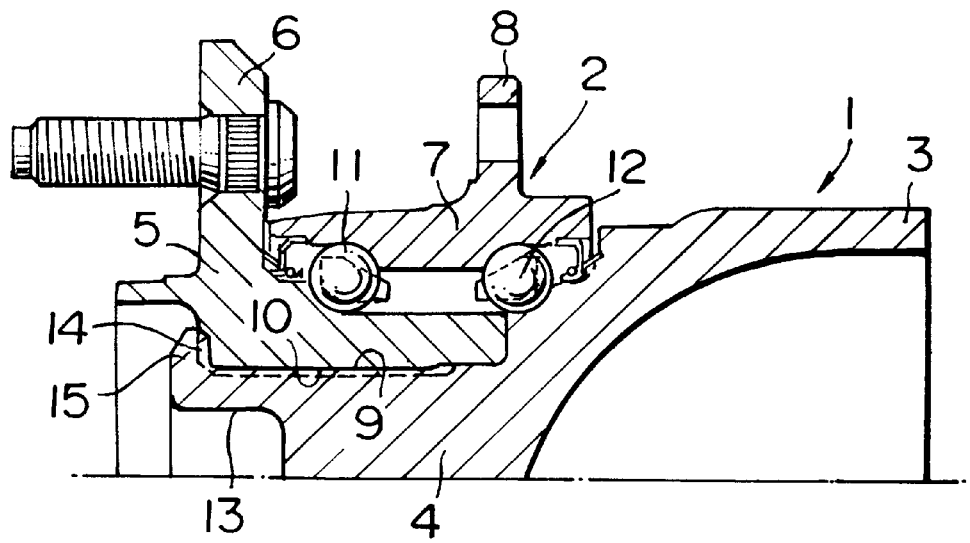
FIG. 1 is a sectional view of a bearing device for a wheel according to an embodiment of the present invention.
Figure 2:
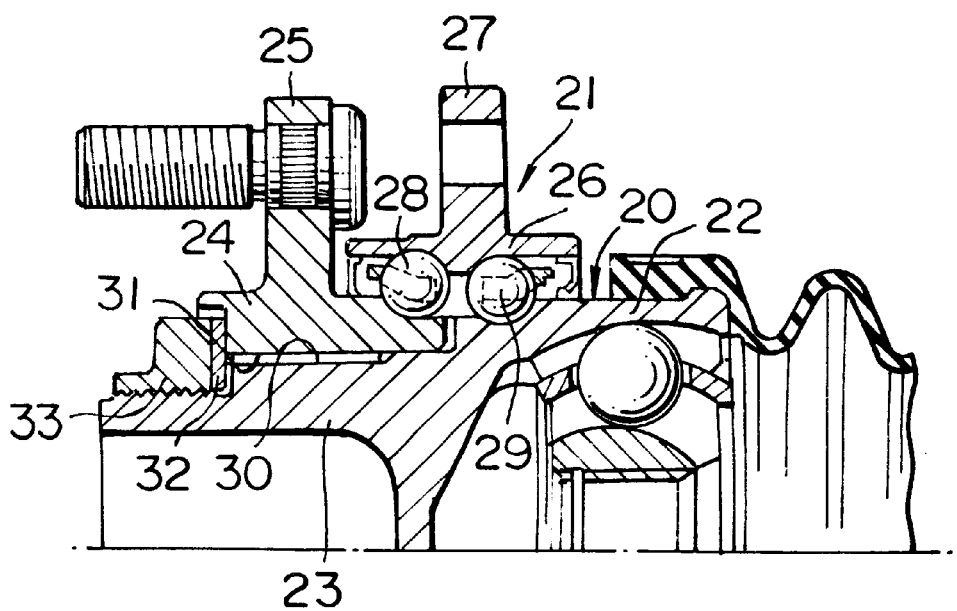
FIG. 2 is a sectional view of a conventional bearing device.

One embodiment of the present invention will be explained with reference to the drawing.

Referring to FIG. 1, an axially extending shaft 4 is integrally formed on the side of a closed surface of a bowl-like outer ring 3 of a uniform universal joint 1, and a spline 9 is formed in the outer peripheral surface of the shaft 4 and is fitted in a spline 10 formed in an inner ring 5 of a roller bearing 2.

The construction of the roller bearing 2 will be described in more detail, which comprises the inner ring 5 formed with a flange 6 for mounting a wheel at an outer peripheral surface and formed with the spline 10 at an inner peripheral surface thereof, an outer ring 7 formed with a flange 8 for mounting a vehicle body at an outer peripheral surface thereof, and rolling bodies 11, 12 interposed between the inner and outer rings 5, 7.

The rolling bodies 11, 12 are constituted in two rows. One row rolling body 11 is interposed between the outer ring 7 and the inner ring 5, and the other row rolling body 12 is interposed between the outer peripheral surface of the bowl-like outer ring 3 of the uniform universal joint 1 used in combination with the inner ring and the outer ring 7.

Alternatively, the bowl-like outer ring 3 and the inner ring 4 may be integrally formed by forging or may be integrally formed by welding or by separate fastening parts.

A recess 3 having an axially predetermined depth and a diametral thickness is formed in a central portion of the end of the shaft 3. Further, a plurality of radial recesses 14 are formed in a circumference of the end on the side of the end of the shaft of the inner ring 5. In the state in which the shaft 4 and the inner ring 5 are fitted in the splines 9, 10, the recess 13 of the shaft is spread from the inner peripheral side to the outer peripheral side by rolling and caulking to form a radial collar 15. A part of the collar 15 is caused to be encroached upon a radial recess 14 of the end of the inner ring at time of rolling and caulking. Thereby, the bearing 2 is rigidly secured to the shaft 4.

I claim:

1. A bearing device for a wheel comprising:

an outer ring of a uniform universal joint;

a shaft integral with said outer ring and extending in an axial direction and formed with a spline at an outer periphery;

an outer ring of a rolling bearing;

an inner ring formed with a flange for mounting a wheel at an outer periphery thereof and formed with a spline fitted in the first-mentioned spline at an inner periphery thereof;

rolling bodies interposed between said inner and outer rings of said roller bearing;

a recess formed in a central portion of the end of said shaft;

a plurality of recesses formed in a circumference of the end of said inner ring on the end side of said shaft;

a collar spread from the inner peripheral side to the outer peripheral side by rolling and caulking the recess of the end of said shaft an formed in a radial direction; and fixing means for, in the state in which said shaft is fitted in the spline of the inner ring, causing said collar to encroach upon the radial recess of said inner ring to secure the inner ring to the shaft.

* * * * *